United States Patent [19]
Bennett et al.
[11] 3,713,110
[45] Jan. 23, 1973

[54] MECHANICALLY ALTERABLE DIODE MATRIX MEMORY

[75] Inventors: Joseph C. Bennett, Lisle; William A. Reimer, Wheaton, both of Ill.

[73] Assignee: GTE Automatic Electric Laboratories, Incorporated, Northlake, Ill.

[22] Filed: Aug. 23, 1971

[21] Appl. No.: 182,679

[52] U.S. Cl. ..............................340/173 SP, 307/317
[51] Int. Cl.............................G11c 5/06, G11c 17/00
[58] Field of Search ..................307/317; 340/173 SP

[56] References Cited

UNITED STATES PATENTS

| | | | |
|---|---|---|---|
| 2,899,676 | 8/1959 | Rivers | 340/173 SP |
| 3,504,132 | 3/1970 | Wallace | 340/173 SP |
| 3,653,005 | 3/1972 | Porter | 340/173 SP |

*Primary Examiner*—Terrell W. Fears
*Attorney*—K. Mullerheim et al.

[57] ABSTRACT

A planar diode matrix memory includes a pluggable wire strap to couple a diode between an input conductor on a printed wiring card and output bus bar. The rearrangement of the diode couplings is easily made via rearrangement of the wire straps.

6 Claims, 1 Drawing Figure

PATENTED JAN 23 1973 3,713,110
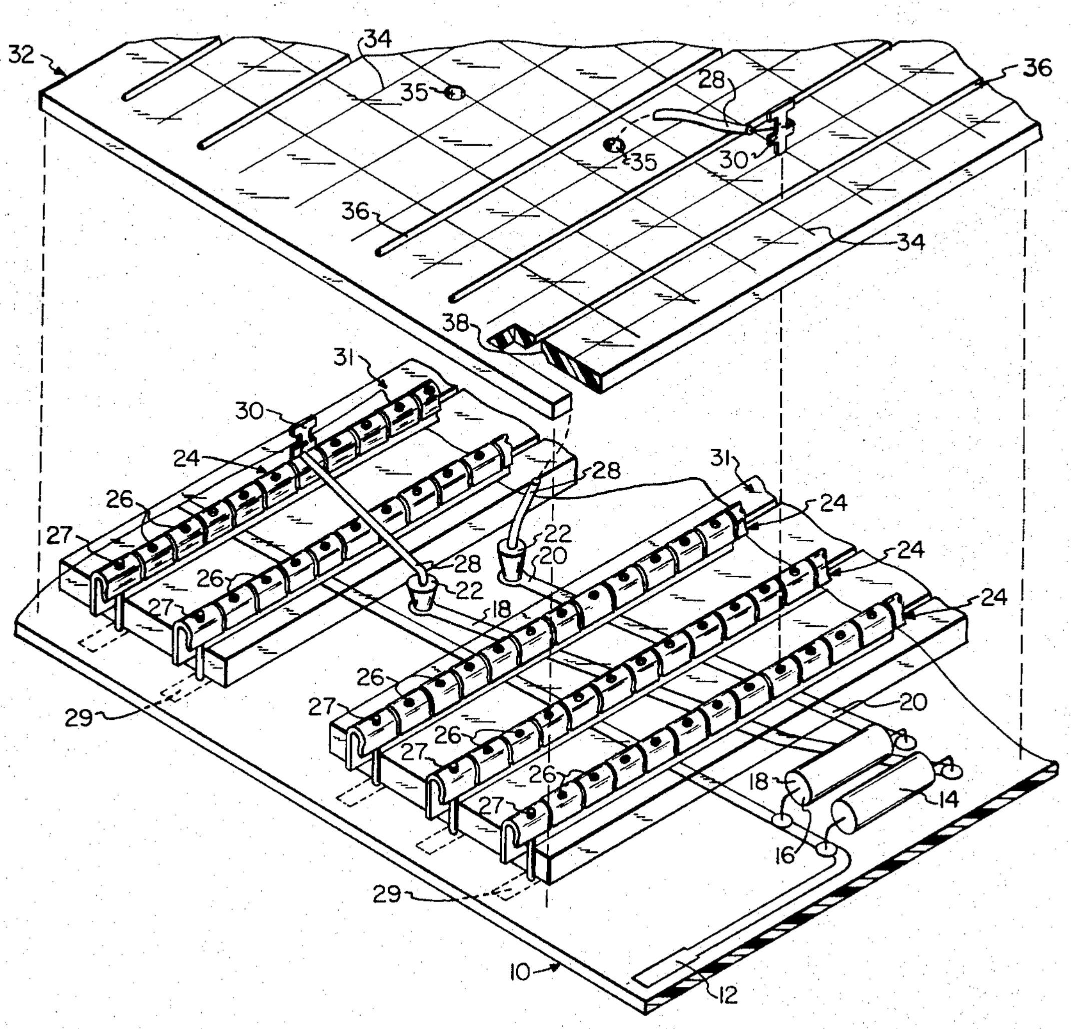
INVENTORS
JOSEPH C. BENNETT
WILLIAM A. REIMER
BY Robert Haas Epps
ATTORNEY

MECHANICALLY ALTERABLE DIODE MATRIX MEMORY

BACKGROUND OF THE INVENTION

1. Field of the Invention

The present invention relates most generally to memory systems and more particularly to an improved mechanically alterable diode matrix memory.

2. Description of the Prior Art

The diode matrix has been used to provide small, mechanically alterable, semi-permanent memories. In such memories a group of parallel input wires is placed over a group of parallel output wires to form a grid. Whenever an interconnection is to be made between an input and output wire a diode is used to prevent undesired multiple electrical paths within the matrix. Prior to the present invention the diode matrix arrangement involved the soldering or other semi-permanent connection of the diodes to the input-output grid. Although generally acceptable in many applications, memories of this type are not well adapted for use where it is desired that the memory coding be changed periodically. To effect alterations in the prior art memories requires disassembly of the diodes from the grid and reassembly in the new coding configuration. A significant amount of wear and tear will clearly attend this approach and have a deleterious effect upon the useable lifetime of the memory in such applications. A pluggable diode has been developed for use with an insulator block having orthogonal bus bars on opposite surfaces, and mountable as a unit on printed wiring cards, however, this type of arrangement involves four friction contact surfaces; i.e., two on each diode and one each on the input and output conductors. It is clear that the more frictional electrical contacts of uncontrolled or unknown quality that are present in a given apparatus the more expensive and less reliable that apparatus will be.

OBJECTS AND SUMMARY OF THE INVENTION

From the foregoing discussion it will be apparent that among the various objectives of the present invention are included:

the provision of a new and novel mechanically alterable diode matrix memory, the provision of apparatus of the above-described character having improved mechanical alterability, the provision of apparatus of the above-described character having a minimum of frictional contacts, and the provision of a diode matrix memory of improved reliability and lower fabrication expense.

These and other objectives of the invention are efficiently achieved by providing a pluggable wire strap to couple a diode between an input conductor and any of a plurality of output conductors. Only one frictional coupling is required which may easily be changed without structural modification of the memory.

The foregoing as well as other objectives, features and advantages of the present invention will become more apparent from the following detailed description taken in conjunction with the appended drawing.

BRIEF DESCRIPTION OF THE DRAWING

The sole appended drawing is a partial schematic elevation view of a simplified version of the preferred embodiment of the present invention.

DESCRIPTION OF THE PREFERRED EMBODIMENT

Turning now to the appended FIGURE there is illustrated a simplified version of a diode matrix memory fabricated in accordance with the principles of the present invention. The illustrated embodiment is an example of so-called two out of five coding wherein two diodes are required for one input that is to be coupled to any two of five outputs. A printed wiring card 10 is provided with at least one printed input conductor 12 to which the anodes of first and second diodes 14 and 16 are coupled. The cathodes of the diodes 14 and 16 are coupled respectively to one end of first and second intermediate printed circuit paths 18 and 20. Each of these intermediate printed circuit paths 18 and 20 are terminated in apertures adapted to receive a wire terminal 22. A plurality of output circuit paths preferably provided by generally parallel spring-type bus bars 24 are mounted on the printed wiring card 10 and are each provided with a plurality of terminal receiving apertures 26. Each bus bar 24 is provided at each end with a conductive mechanical support post 27 which is coupled at one end to an output printed circuit path 29 such that the wiring card may simply be inserted in a conventional socket (not shown). A particular bus bar arrangement found by the Applicants to be of utility in the practice of their invention is described in U.S. Pat. No. 3,582,864 which issued to James L. Sullivan on June 1, 1971. Insulative spacers 31 may be inserted between adjacent bus bars 24 to maintain the spacing necessary to prevent shorting.

A wire strap 28 is coupled at one end to a wire terminal 22 and at the other to a pluggable terminal 30 which may be inserted in an aperture 26 in any selected bus bar 24. The pluggable terminal 30 is preferably formed from rectangular wire and gold plated to provide a high quality electrical contact surface. The wire strap 28 may be inserted in an aperture in the pluggable terminal 30 which is then crimped against the wire strap 28.

It is preferred that the diodes 14 and 16 and wire terminals 22 be permanently secured to and coupled with the circuit portions 12, 18 and 20 of the printed wiring card 10 such as by conventional wave soldering techniques. The wire strap 28 is also preferably affixed to the terminals 22 such that the number of friction contact points are minimized, fabrication costs reduced and overall reliability increased. The mechanical alterability of the resulting memory is simplified through the above construction since the cathode connection of any given diode may readily be altered by merely relocating the associated pluggable terminal 30 to the desired bus bar 24.

Although a single input memory has been described it will be understood that a diode matrix memory of any desired number of inputs or outputs or type of coding may readily be provided by expansion of the basic arrangement shown in the FIGURE. With the high density packaging available through the practice of this invention it may become difficult to observe which wire strap is associated with which input circuit. To eliminate this problem a designation plate 32 having a grid 34 inscribed thereon may be overlayed on the bus bars 24. The wire straps may be brought out through holes 35 in this plate on the appropriate input lines of the grid. Slots 36 are provided in alignment with the bus bars 24 such that the pluggable terminals 30 may simply be inserted therethrough. It will be apparent that the designation plate may easily be constructed with appropriate grooves 38 on its underside to engage the bus bars and provide the spacing means discussed above.

Having described what is new and novel and desired to secure by Letters Patent, what is claimed is:

1. A diode matrix memory comprising
an electrically conductive input circuit path,
a plurality of electrically conductive output circuit paths,
an intermediate electrically conductive circuit path,
a diode having the anode thereof coupled to said input circuit and the cathode thereof coupled to one end of said intermediate circuit path,
a wire strap coupled at one end to said intermediate circuit path,
a pluggable terminal element coupled to the other end of said wire strap, and
each of said plurality of electrically conductive output circuit paths being provided with a plurality of apertures adapted to receive and retain said pluggable terminal element
whereby said input circuit path is coupled through said diode, said intermediate circuit path, said pluggable terminal and said wire strap to any selected one of said plurality of output circuit paths.

2. Apparatus as recited in claim 1 wherein
said input circuit path and said intermediate circuit paths are the printed circuits of a printed wiring card,
each of said output circuit paths are spring-type bus bars mounted on said printed wiring card.

3. Apparatus as recited in claim 2 further including
an output printed circuit path, and
an electrically conductive mechanical support member fixed at one end to said bus bar and at the other end thereof to said output printed circuit path.

4. Apparatus as recited in claim 1 wherein
said diode is substantially permanently affixed in electrical contact between said input circuit path and said intermediate circuit path, and
said wire strap is substantially permanently affixed in electrical contact to said intermediate circuit path.

5. Apparatus as recited in claim 2 further including
electrically insulative support means disposed on said printed wiring card and between said bus bars.

6. Apparatus as recited in claim 2 further including
an electrically insulative designation plate having a grid indicia inscribed on a first major surface thereof corresponding to said input and output circuit paths, an aperture disposed through said plate on a portion of said grid indicia corresponding to said input circuit path, slots disposed through said plate along the portions of said grid indicia corresponding to each said output circuit paths, and a plurality of grooves disposed in the opposite major surface of said plate in communication with said slots and adapted to engage each said bus bar along the length thereof
whereby said bus bars are retained in a fixed spatial relationship with respect to one another and said wire straps may be passed through said aperture and said pluggable terminal may be inserted through said slot to engage said bus bar.

* * * * *